US008180563B2

(12) United States Patent
Chang et al.

(10) Patent No.: US 8,180,563 B2
(45) Date of Patent: May 15, 2012

(54) METHOD FOR MODIFYING NAVIGATION INFORMATION AND NAVIGATION APPARATUS USING THE SAME

(75) Inventors: Shyang-Jye Chang, Taipei County (TW); Yung-Yu Chen, Pingtung County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 457 days.

(21) Appl. No.: 12/411,776

(22) Filed: Mar. 26, 2009

(65) Prior Publication Data

US 2010/0131198 A1      May 27, 2010

(30) Foreign Application Priority Data

Nov. 25, 2008   (TW) ................................ 97145440 A

(51) Int. Cl.
*G01C 21/36*     (2006.01)
(52) U.S. Cl. ......... 701/209; 701/207; 701/210; 701/200
(58) Field of Classification Search .................. 701/210, 701/200, 207, 209
See application file for complete search history.

(56) References Cited

U.S. PATENT DOCUMENTS

| 5,043,902 | A |   | 8/1991 | Yokoyama et al. | |
|---|---|---|---|---|---|
| 5,774,824 | A |   | 6/1998 | Streit et al. | |
| 5,828,987 | A | * | 10/1998 | Tano et al. | 702/150 |
| 6,005,492 | A | * | 12/1999 | Tamura et al. | 340/937 |
| 2002/0099481 | A1 | * | 7/2002 | Mori | 701/23 |
| 2006/0247854 | A1 | * | 11/2006 | Esaki et al. | 701/210 |

FOREIGN PATENT DOCUMENTS

JP     2692822 B2     12/1997

OTHER PUBLICATIONS

State Intellectual Property Office of the People'S Republic of China, "Office Action", Jul. 18, 2011, China.

* cited by examiner

*Primary Examiner* — Mark Fadok
(74) *Attorney, Agent, or Firm* — Morris Manning & Martin LLP; Tim Tingkang Xia, Esq.

(57) ABSTRACT

A method for modifying navigation information is provided in the present invention. The method comprises steps of detecting a status information with respect to a moving carrier guiding by a navigating route; comparing the status information with a characteristic information corresponding to a characteristic point on the navigating route; and finally, determining whether the moving carrier is passing the characteristic point according to the comparing result and modifying the coordinate position of the carrier. In another embodiment, the present invention further provides a navigating apparatus comprising a sensing module for detecting the status of the moving carrier, a signal processing unit, and a storage unit for storing a map information. The signal processing unit comparing the status information to the characteristic information with respect to the characteristic point on the navigating route, and modifying the deviation of the moving carrier to the modify location according to the comparing result.

16 Claims, 11 Drawing Sheets

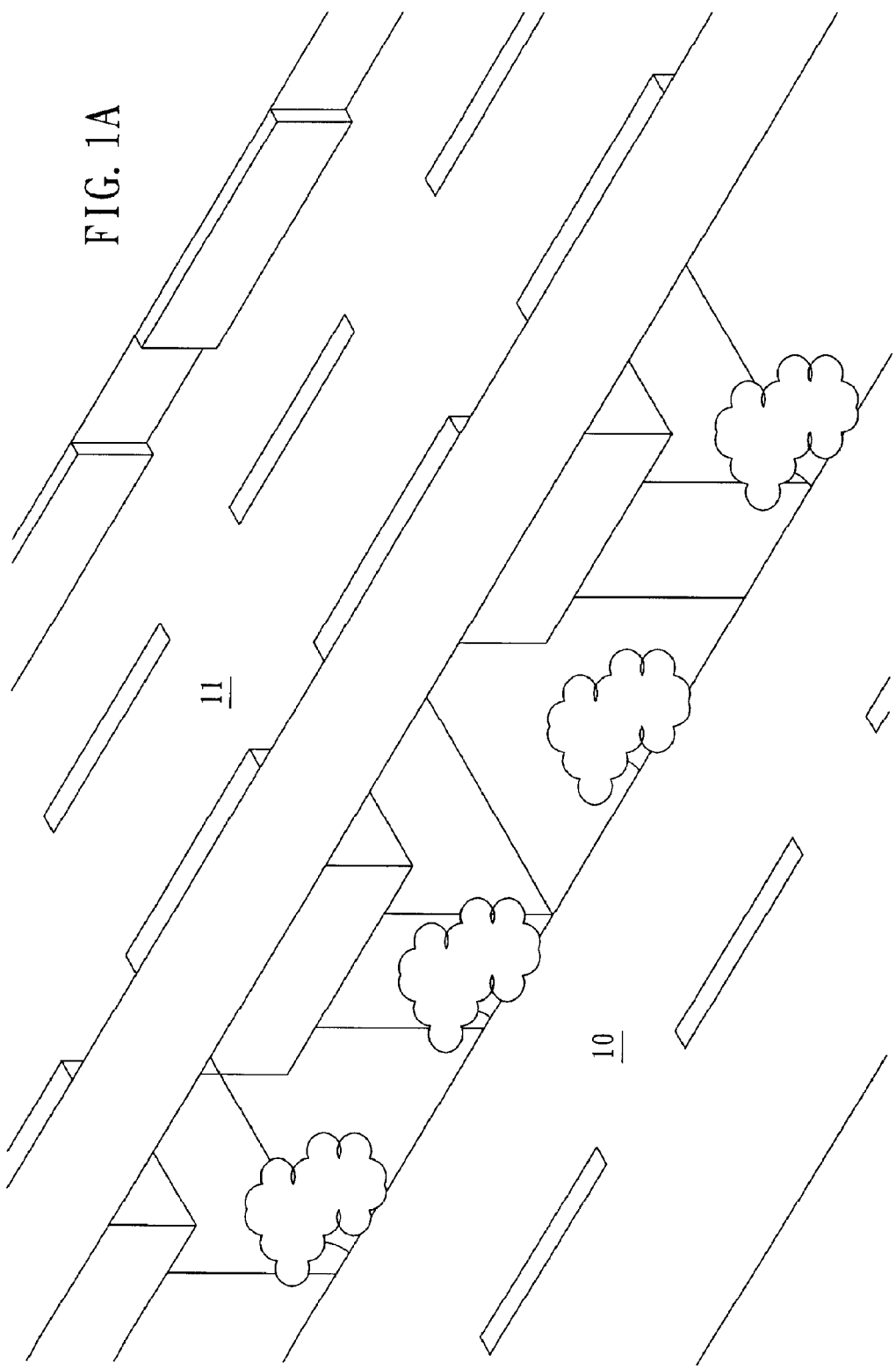

METHOD FOR MODIFYING NAVIGATION INFORMATION AND NAVIGATION APPARATUS USING THE SAME

FIELD OF THE INVENTION

The present invention relates to a navigating technique, and more particularly, to a method for modifying navigation information and navigation apparatus for modifying the navigating position of the carrier.

BACKGROUND OF THE INVENTION

With the great development of public traffic construction, underground passages and elevated highways constructed in the downtown area of city are getting more and more for improving the space utilizing efficiency. Although the traffic constructions is capable of improving the space utilization or transportation efficiency, those constructions could become obstructions for impeding the reception of satellite signals for portable navigation devices (PND) so as to affect the navigating and positioning quality such that the users may not have faith to count on the related products of global positioning system (GPS). Taking the constructions shown in FIG. 1A as an example, it illustrates a plane road 10 and an elevated highway 11, such as a viaduct, constructed parallel to the plane road 10. When a carrier is moving on the plane road 10, the elevated highway 11 will impede the satellite signals so as to reducing the communication quality for satellite positioning. In addition, when a carrier is moving on the roadway between the high buildings in a downtown area illustrated in the FIG. 1B, there are also many dead spaces influencing the reception of the satellite signals in such area. Meanwhile, taking an example when a carrier is moving inside an underground passage, the satellite signals will also be impeded as well. Therefore, for the foregoing said road features while using the GPS, the conventional navigation software with respect to the GPS will not provide a modified navigating route due to the problem of signals obstruction.

For solving the satellite signals obstruction of GPS in foregoing cases, inertial navigation system (INS) will be an alternative solution for continuing to perform the navigating and positioning function. However, as shown in FIG. 2, which is an illustration showing inaccuracy caused by the conventional inertial navigating system, a carrier 90 is expected to circle around along a roadway 12, and the real line 13 is a theoretical navigating round displayed on a screen. Since the conventional INS has a problem of accumulated error, the position of the carrier shown in the display will be deviated from the theoretical navigating road 13 after the inertial signal of INS is accumulated for a period of time. Hence, if the accumulated error of INS during the carrier moving is not modified immediately, an erroneous deviation due to the accumulated error will induce an erroneous route 14 shown on a display after the carrier is circling around the roadway 12.

The foregoing problem is common in the prior art of navigation, so the U.S. Pat. No. 5,774,824 is provided to solve the problem, wherein the technique judges error according to a measured point of the vehicle and a matched point of the vehicle on a map route defined according to a map database having a plurality of links and a plurality of nodes. If the measured point deviated from the map route, then an analyzer detects an end of a curve in the map route and updates the measured point and the matched point to the end of the curve and the modified navigating information is displayed on a display unit for guiding the driver. Owing to the foregoing method is performed base on an assumption that the carrier is impossible to deviate the route, so sticking the image representing the carrier on the map route compulsorily according to transverse deviation between the measured point associated of the vehicle and the matched point with respect to the map route can only modify the deviation of transversely but can't modify the radial deviation of the carrier and positioning information.

SUMMARY OF THE INVENTION

The present invention provides a method for modifying navigation information and navigation apparatus in which position of the moving carrier and sticking icon representing the carrier are modified timely by comparing a status information such as azimuth angle and attitude angle associated with the carrier with a characteristic information with respect to a characteristic point on navigating rout.

The present invention provides a navigation apparatus which has a sensing module being adapted for sensing a moving status of a carrier and compares the moving status of the carrier with different characteristic information corresponding to the different characteristic points respectively in a navigating route generated according to the map information to find the correct position of the carrier with respect to the navigating route. The apparatus then modifies the position of the carrier to the correct position on the navigating route shown in a display so as to provide correct navigating information to driver immediately.

In an embodiment, the present invention provides a method for modifying navigation information comprising steps of: providing a navigating route for a carrier; acquiring a characteristic point, having a characteristic information, on the navigating route; detecting moving status of the carrier so as to obtain a status information with respect to the carrier while the carrier is moving; comparing the characteristic information with the status information to determine whether the characteristic information is corresponding to the status information or not; continuing to monitor the moving status of the carrier if the characteristic information is not corresponding to the status information; and modifying coordinate position of the carrier to a position corresponding to the characteristic point on the navigating route if the characteristic information is corresponding to the status information.

In another embodiment, the present invention further provides a navigating apparatus disposed on a carrier comprising: a sensing module for detecting a moving status of the carrier and generating a status information associated with the moving status; a storage media unit for storing a map information and at least a characteristic information wherein each characteristic information is associated with a characteristic point on the map information; and a signal processing unit, coupled to the sensing module and the storage media unit, for generating a navigating route according to the map information and comparing the state information with at least one characteristic information associated with at least one characteristic point respectively on the navigating route so as to determine whether the coordinate position of the carrier need to be modified.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 1A and FIG. 1B are an illustration of a roadway for carrier moving.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1B:
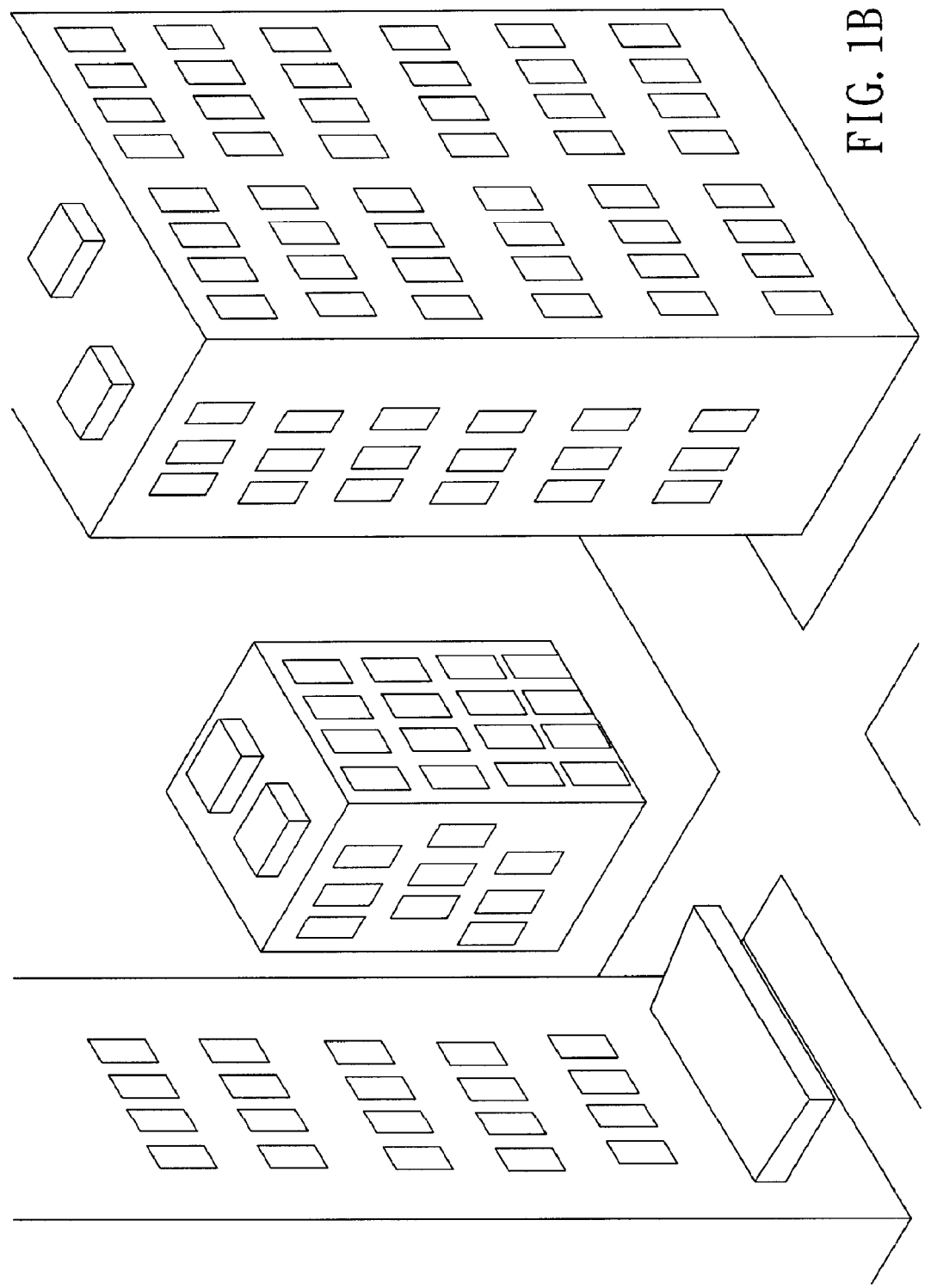
Figure 2:
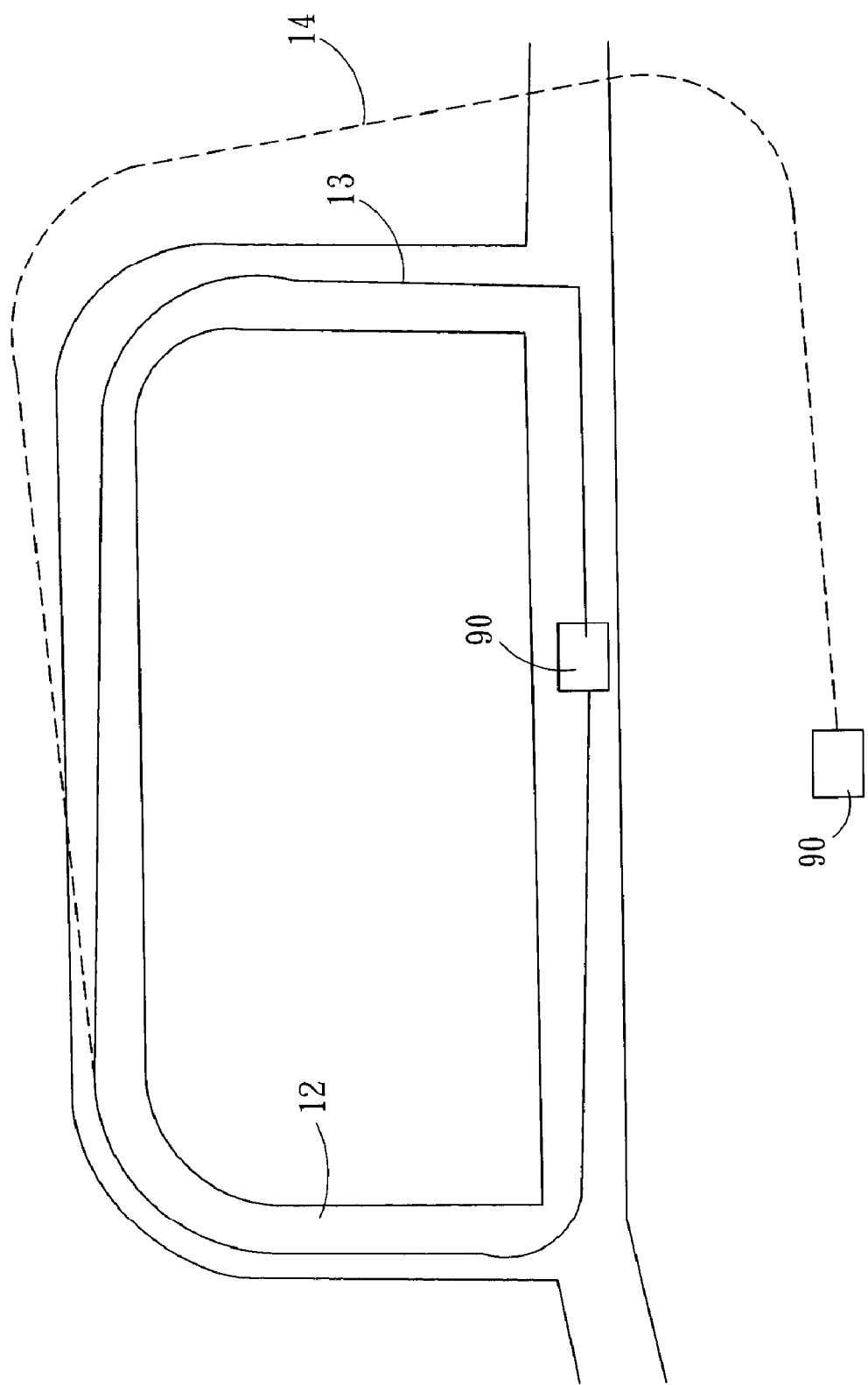
FIG. 2 is an illustration of inaccuracy caused by the conventional inertial navigating system.
Figure 3:
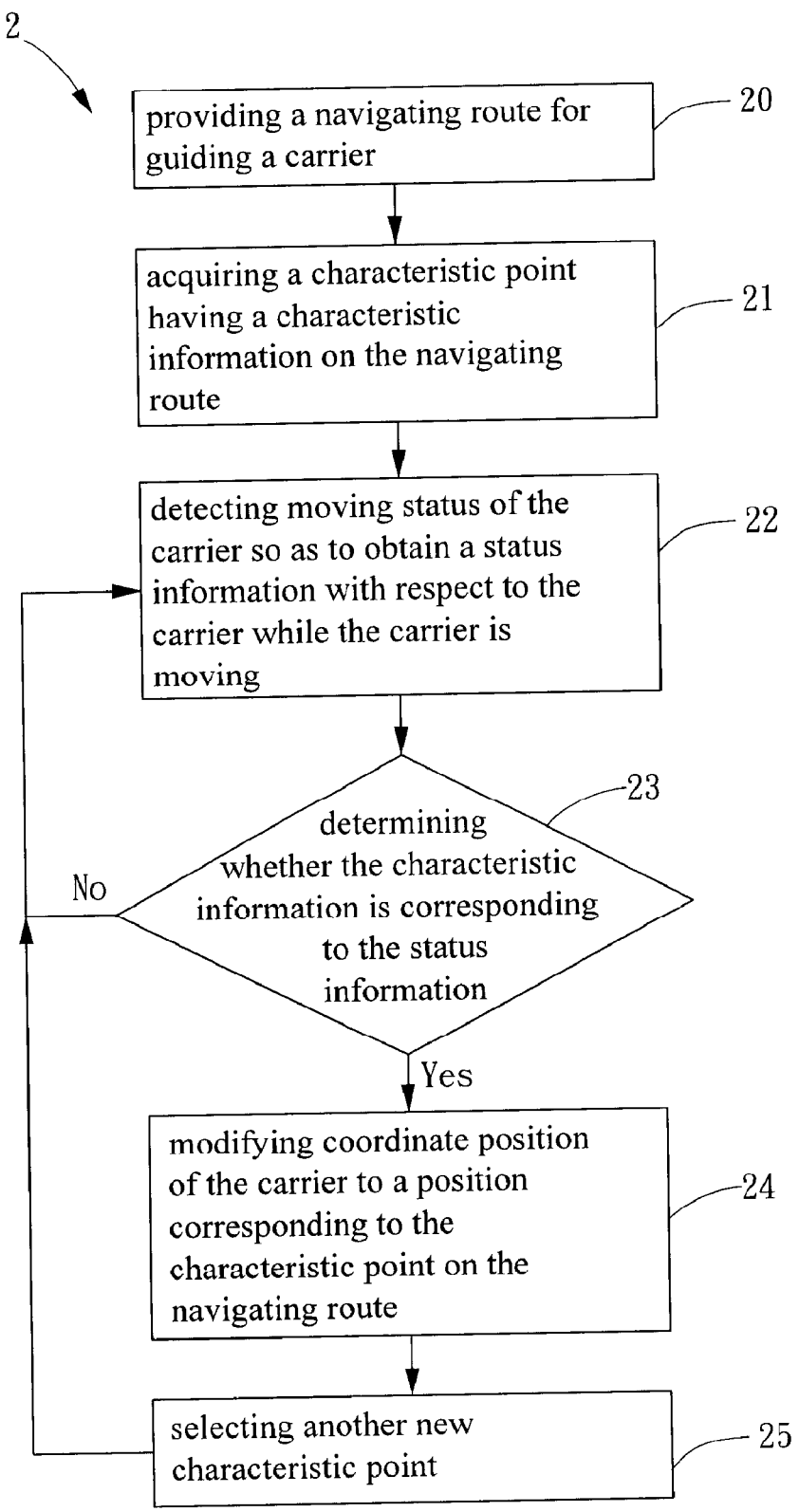
FIG. 3 is a flow chart illustrated a embodiment of the method for modifying navigating information provided in the present invention.

Please refer to FIG. 3 which is a flow chart illustrated an embodiment of the method for modifying navigating information provided in the present invention. The method 2 is started from step 20 for providing a navigating route for guiding a carrier. In the step 20, there are many ways to generate the navigating route. For example, the navigating route is capable of being generated by the conventional GPS or guiding map program. Generally speaking, the navigating route is generated according to the place name or coordinate position (longitude and latitude) of start point, and the place name or coordinate position (longitude and latitude) of end position, and the rule of time such as shortest time or distance such as shortest distance. The arts for generating navigating route belong to known techniques and will not therefore be described in detail. In addition, the carrier in the step 20 is referred to wheel vehicle, which can be, but is not limited to, a motorcycle or an automobile, for example.

Figure 4:
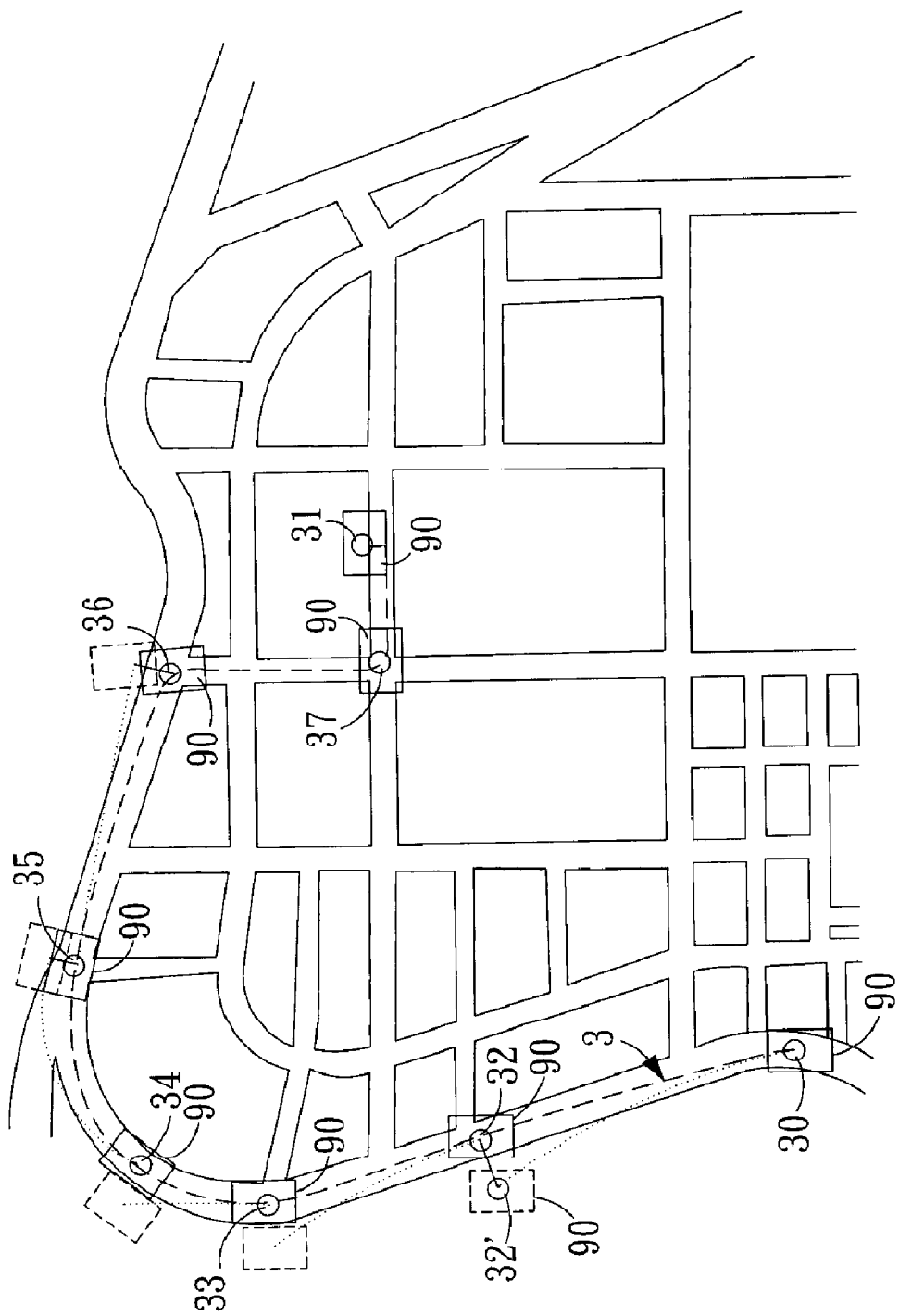
FIG. 4 illustrates navigation rouge generated for the carrier.
Figure 5:
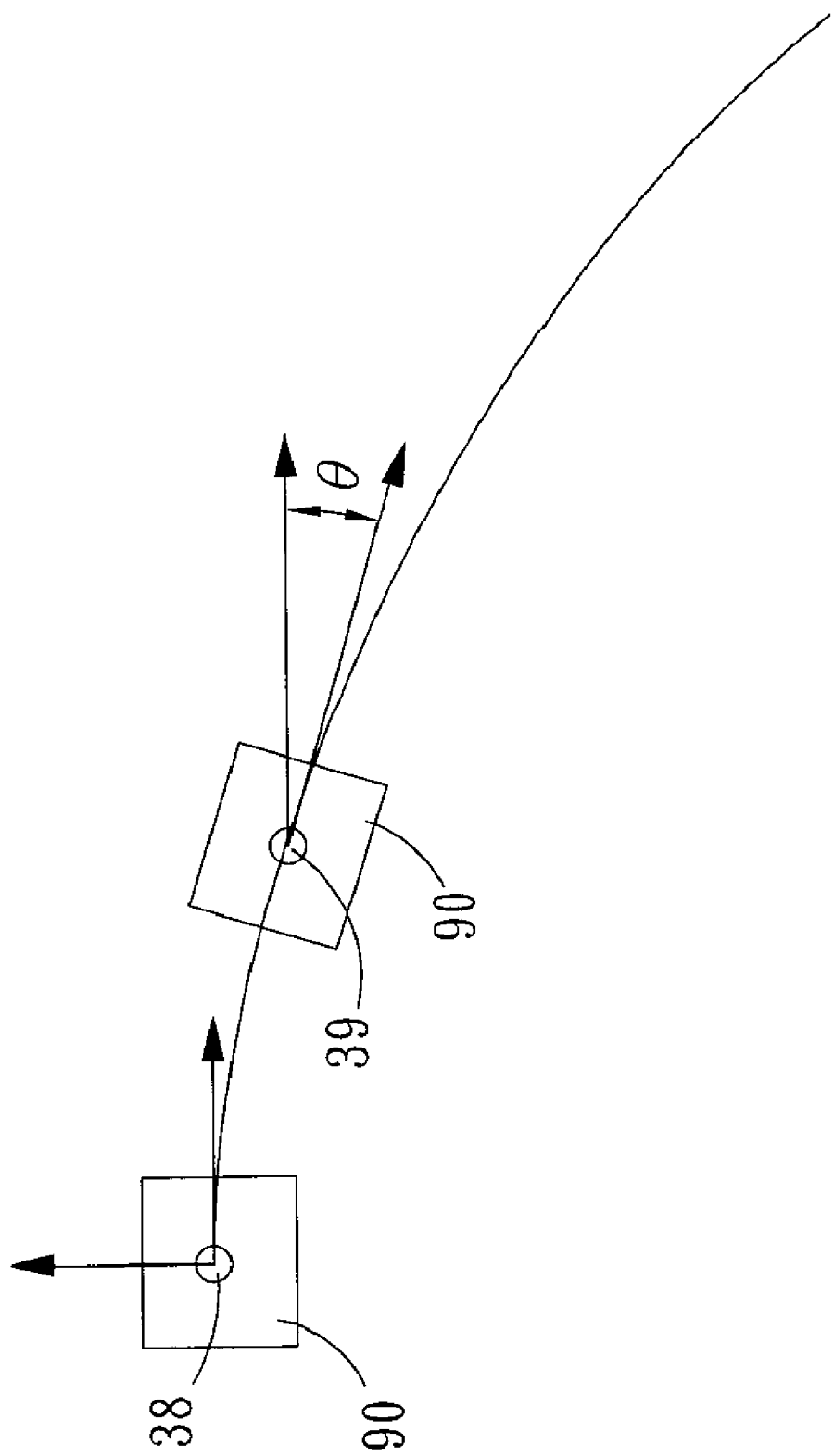
FIG. 5 illustrates an azimuth angle with respect to the carrier.

Next, a step 21 is proceeded to acquire a characteristic point having a characteristic information on the navigating route. Please refer to FIG. 4, which is an illustration of the navigating route. In FIG. 4, numeral 3 represents the navigating route, and point 30 and 31 represent the start point and end point of the navigating route respectively while the point 32 to 37 represent the characteristic points on the navigating route 3. In the present embodiment, the location for determining the characteristic points on the navigating route includes, but is not limited to, a turn location or location of downhill or uphill. In FIG. 4, each characteristic point 32 to 37 has a corresponding characteristic information. In the present embodiment, the characteristic information may include, but is not limited to, an azimuth angle, an attitude angle, or the combination thereof. Firstly, an explanation for azimuth angle is illustrated in FIG. 5, which is an azimuth angle with respect to the carrier. The azimuth angle of the present invention refers to the required angle for turning while the carrier is turning. For example, in the FIG. 5, the azimuth angle of the carrier 90 at the characteristic point 38 is 0 degree while the azimuth angle of the carrier 90 at characteristic point 39 is θ degree.

Figure 6A:
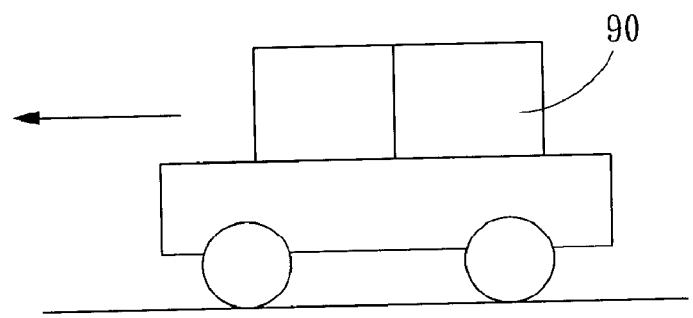
FIG. 6A to 6C illustrate attitude angle with respect to the carrier.
Figure 6B:
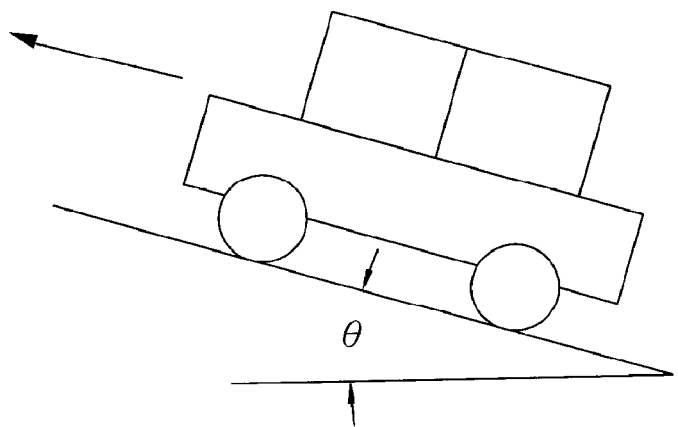
Figure 6C:
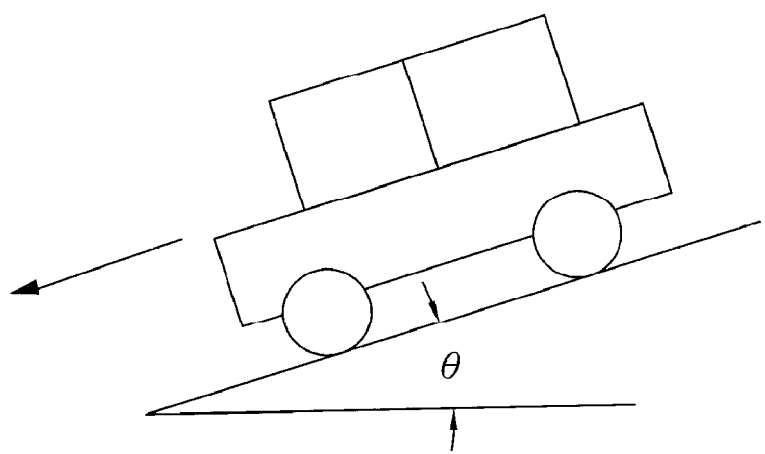

On the other hand, the attitude angle of the present invention refers to the angle of elevation or angle of depression with respect to the carrier. Since there are many different road conditions such as flat, uphill, downhill, tunnel, interchange for moving on elevated highway and so on in some certain locations along the navigating route 3 shown in FIG. 4, the attitude angle of the carrier 90 will change with respect to the different road conditions while the carrier 90 is moving thereon. Please refer to FIG. 6A to 6C, which illustrate attitude angle with respect to the carrier in different road conditions. In FIG. 6A, which is an example while the carrier 90 is moving on a flat roadway, the attitude angle of the carrier is 0 degree or around the 0 degree. In FIG. 6B, which is an example while the carrier is moving uphill or moving on on-ramp to enter the elevated highway, the attitude angle of the carrier is around the θ degree. In another case shown in FIG. 6C, which is an example showing the carrier is moving downhill, moving down the tunnel or moving on off-ramp to exit the elevated highway, the attitude angle of the carrier is around the −θ degree.

In short, when the carrier is moving under different road situations (turn, uphill or downhill), the attitude angle and azimuth angle of the carrier will change with respect to the road conditions. Besides, the navigating route is determined according to the map information, which is built according to the conventional arts and is not necessary to be described further; however, in the present invention, the novelty different from the prior art is that characteristic points within the map information will be determined and the characteristic information with respect to the characteristic point will be built in advance while building the map information so that the map information, characteristic point and the corresponding characteristic information will be constructed at the same time and stored in a database. Taking the FIG. 4 as an example, in the real road condition associated with the characteristic point 37, there are probably moving forward, right turn, left turn, or even U-turn will be occurred when the carrier is moving on the point 37, so it is capable of measuring and recording the azimuth angle and attitude angle when the carrier performs the right turn, left turn, moving forwardly, or U-turn from the characteristic point 37 respectively in advance. Another example of characteristic point 34, it has road condition of uphill and right turn, so when the carrier is moving on characteristic point 34, the corresponding characteristic information of azimuth angle and attitude angle is measured and recorded with respect to those road conditions in advance. Accordingly, when building the map information, the azimuth angle and attitude angle associated with each determined characteristic point in the certain area corresponding to map information will also be measured so as to form the so called characteristic information in the present invention and recorded in database for the subsequent steps of method 2.

Back to the FIG. 3, after inputting start point and end point, step 20 is proceeded to generate the navigating route 3 and characteristic points will also be determined at the same time, which are both shown in FIG. 4. Meanwhile, during the process for generating the navigating route, the characteristic information with respect to the plurality of characteristic points 32 to 37 respectively on the navigating route are obtained from the database and then are stored in the temporary memory. Taking characteristic point 37 as an example, although there are probably 4 kinds of characteristic information associated with left turn, right turn, moving forwardly and U-turn respectively stored in the database, for the navigating route arranged by navigating system, the moving condition of carrier is arranged to turn left at characteristic point 37; therefore, the corresponding characteristic information, i.e. azimuth angle and attitude angle, about turning left is obtained from the database. Similarly, the characteristic information associated the characteristic points 32 to 36 with respect to the moving condition according to the navigating route are also obtained from the database.

Referring back the FIG. 3 to explain the step 21, for the navigating route 3, the first characteristic point that the carrier is supposed to pass through is characteristic point 32. Therefore, the acquired characteristic point in step 21 is characteristic point 32 which is referred to uphill condition with characteristic information of azimuth angle and attitude angle ($\alpha,\beta$). Thereafter, a step 22 is performed for detecting moving status of the carrier timely so as to obtain a status information with respect to the carrier while the carrier is moving. The status information is referred to the detected azimuth angle and attitude angle of the carrier while the carrier is moving actually on the roadway. Afterward, step 23 is executed to compare the characteristic information with the status information to determine whether the characteristic information is corresponding to the status information or not. Since the error will be accumulated during the navigating tracing when the carrier is moving such that the carrier shown in display will deviate the navigating route gradually, the purpose of the step 23 is to use the comparing result between the status information of the carrier in a specific time and the characteristic information of point 32 as a base for judging whether the carrier is passing through the characteristic point 32 or not.

For example, in the FIG. 4, the carrier 90 shown between the start point 30 and characteristic point 32 will deviate from the navigating route 3 due to the accumulated error; therefore, before the carrier 90 arriving at the characteristic point 32, the accumulated error will cause the display position of the carrier to shift to position 32'. For modifying the position of carrier from the point 32' to the characteristic point 32 correctly and accurately, the step 23 is executed to judge whether the status information detected actually is corresponding to characteristic information of characteristic point 32 so as to determine if the carrier is arriving at characteristic 32. If the characteristic information of characteristic point 32 is corresponding to the detected status information of the carrier 90, it is determined that the carrier 90 is arriving at the characteristic point 32 and then the step 24 is performed to modify coordinate position of the carrier 90 to a position corresponding to the characteristic point 32 on the navigating route. The purpose of step 24 is to modify the deviated position of the carrier to the correct position when recognizing that the carrier 90 is just passing through the characteristic point 32 and, in addition, the consequence will be displayed on screen of the display, which means that the dotted icon representing the deviated carrier 90 will be modified to be a solid icon located on the characteristic point 32 on the navigating route 3 shown in FIG. 4.

Referring back to FIG. 3, on the contrary, if the characteristic information is not corresponding to the status information, it represents that the carrier 90 doesn't pass through the characteristic point yet, which means that the carrier is still moving between the characteristic point 32 and start point 30. In this situation, the flow will move back to step 22, and continue to monitor the moving status of the carrier, and detect the azimuth angle and attitude angle of the carrier while the carrier is moving. After acquiring the new status information (azimuth angle and attitude angle) of the carrier, the step 23 is executed again to compare the new status information with the characteristic information of the characteristic point 32 to determine whether the characteristic information is corresponding to the status information or not. In the embodiment, after the step 24, the carrier is recognized to pass through the characteristic point 32. Since there are still having the other characteristic point2 like 33 to 37 on the navigating route, the step 25 will be performed for selecting another new characteristic point 33, a point having condition of turn, and continuing to repeat the step 22 to 23 to judge whether the carrier 90 is passing through the characteristic point 33 or not. The following steps for judging whether the carrier is passing through the characteristic points 33 to 37 are the same as the procedures described before, so it will not be described in detail.

Figure 7:
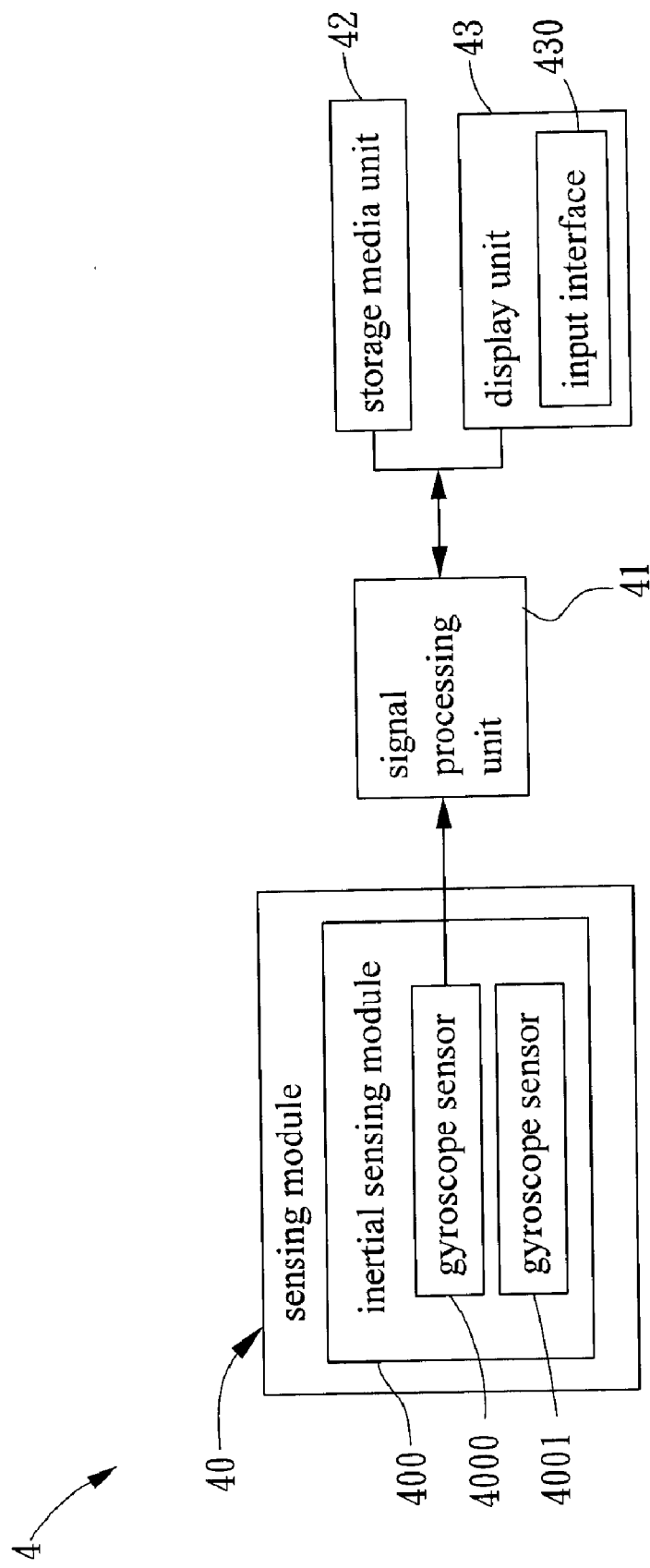
FIG. 7 and FIG. 8 illustrate a block diagram of an embodiment of navigation apparatus provided in the present invention.
Figure 8:
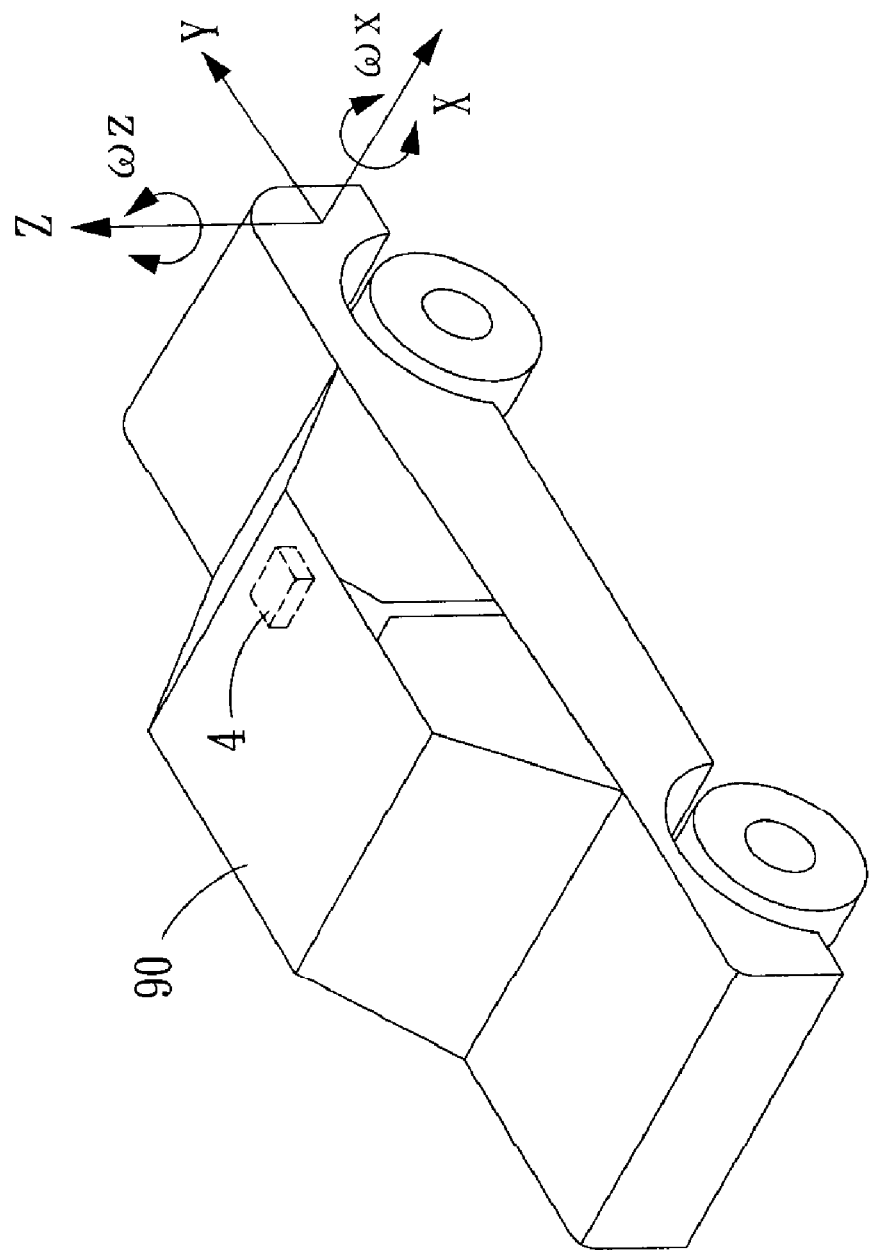

FIG. 7 and FIG. 8 are block diagrams illustrating the embodiment of navigation apparatus provided in the present invention. In the embodiment, the navigation apparatus 4 is disposed on a carrier, which is capable of being a wheel transportation apparatus that may including, but should not be limited to, an automobile or a motorcycle. The apparatus 4 comprises a sensing module 40, a storage media unit 42, a signal processing unit 41 and a display unit 43. The sensing module 40 is adapted to detect a moving status of the carrier for generating a status information associated with the moving status of the carrier and transmit the status information to the signal processing unit. The status information is referred to the azimuth angle and attitude angle of the moving carrier. In the FIG. 8, the azimuth angle represents the angle variation $\omega z$ around the Z-axis while the attitude angle represents the angle variation $\omega x$ around X-axis. The attitude angle will vary with the carrier moving different road condition, which may be an uphill, downhill or flat, for example. Of course, the attitude angle will be 0 degree while the carrier is moving on the flat road condition. On the other hand, the azimuth angle will vary while the carrier is turning, which may be a U-turn, left-turn, or right-turn, for example. Referring back to FIG. 7, in the present embodiment, the sensing module 40 is substantially an inertial sensing module 400 including two gyroscope sensors 4000 and 4001 for detecting the angle variation $\omega x$ and $\omega z$.

Figure 9B:
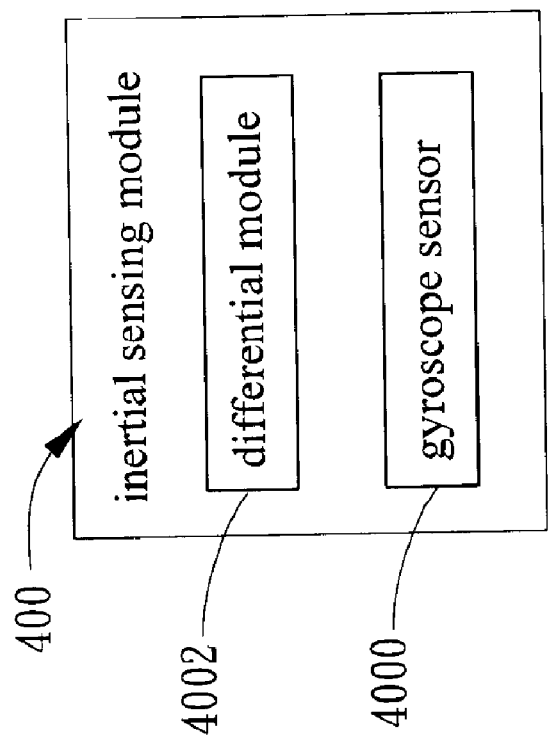
FIG. 9A and FIG. 9B illustrate the second and third embodiments of inertial sensing module of the present invention respectively.
Figure 9A:
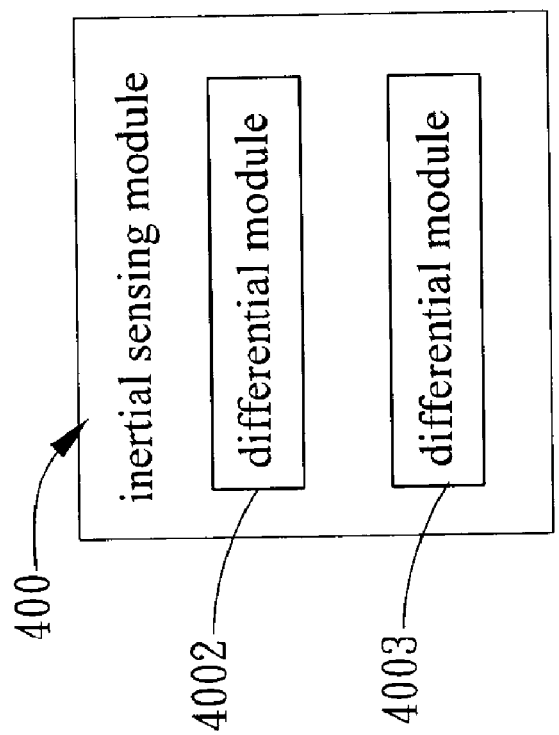
Figure 10:
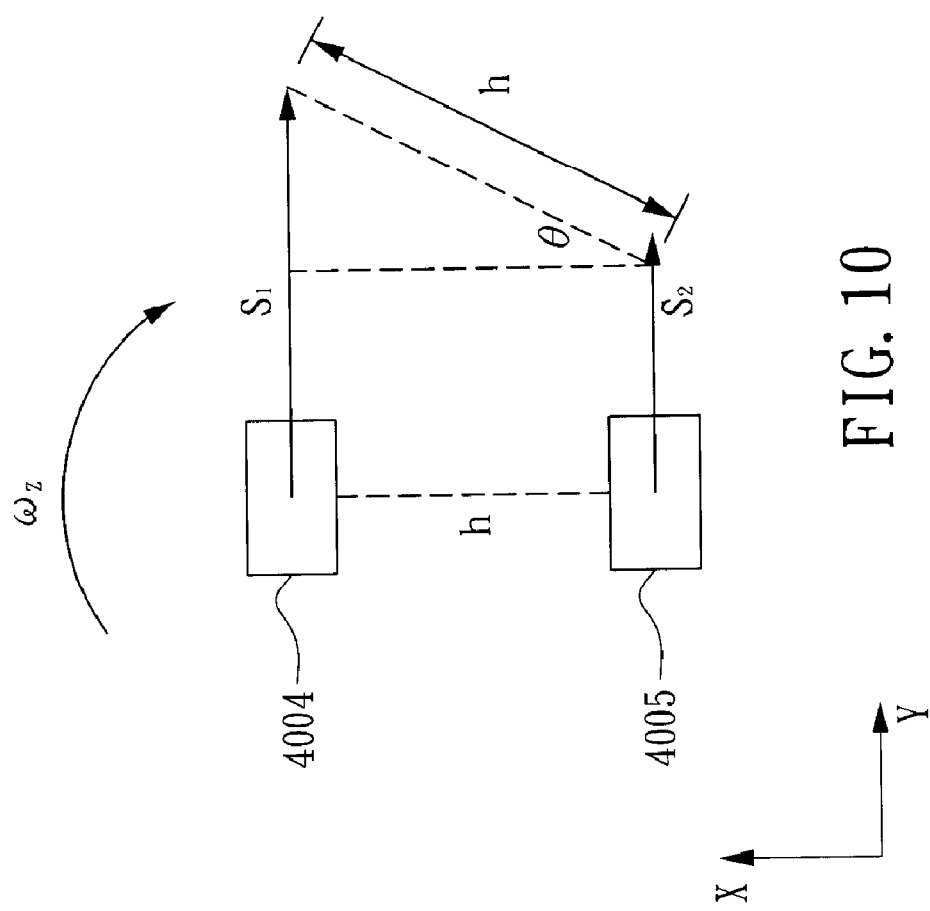
FIG. 10 is an illustration describing the differential calculation by accelerometers.

Besides, please refer to FIGS. 9A and 9B, which are the other embodiments of the sensing module respectively of the present invention. In the embodiment shown in FIG. 9A, the inertial sensing module 400 comprises two differential modules 4002 and 4003. As illustrated in FIG. 10, each differential module 4002 or 4003 has a pair of accelerometers 4004 and 4005 away from a distance h. Taking detecting the angle variation around Z-axis as an example, when accelerometers 4004 and 4005 detect the accelerating signal about the X-axis respectively, the displacement ($S_1$, $S_2$) with respect to the X-axis is capable of being calculated so as to obtain a difference between $S_1$ and $S_2$. Since there is a distance h between the two accelerometers 4004 and 4005, the angle variation with respect to Z-axis is capable of being calculated. Similarly, the angle variation $\omega x$ is capable of being calculated according to the detecting signals of the differential module 4003. Hence, the azimuth angle and attitude angle is capable of being obtained by the embodiment of FIG. 9A. In addition, as an embodiment shown in FIG. 9B, the inertial sensing module 400 has a gyroscope sensor 4000 and a differential module 4002 for detecting the azimuth angle and attitude angle of the carrier.

Figure 11:
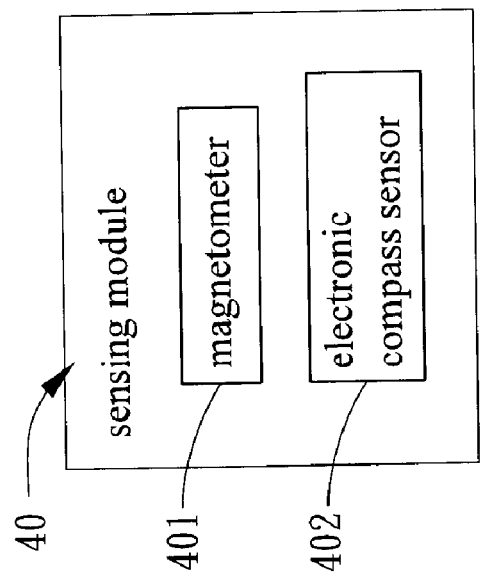
FIG. 11 illustrates the fourth embodiments of inertial sensing module of the present invention.

In addition to the foregoing embodiments of inertial sensing module, the alternative way for implementing sensing module 40 is to utilize a combination shown in FIG. 11 to detect the azimuth angle and attitude angle. In the FIG. 11, the sensing module 40 has a magnetometer 401 and an electronic compass sensor 402, wherein the magnetometer 401 is adapted to detect the attitude angle, while the electronic compass sensor 402 is adapted to detect the azimuth angle. Referring back to the FIG. 7, the storage media unit 42 is adapted for storing the map information and at least a characteristic information obtained in advance wherein each characteristic information is associated with a characteristic point on the map information. In the present embodiment, the storage media unit 42 is a substantially a memory or a hard disk for a database which is capable of being accessed by the signal processing unit 41. In the present embodiment, the storage media 42 stores the map information for arranging the navigating route, which belongs to the conventional art and will not be described in detail. Besides, the storage media 42 further stores the at least one characteristic information with respect to the characteristic points being referred to road condition of uphill, downhill and so on within the map information.

Since the characteristic information such as azimuth angle will be varied when the carrier is turning and the characteristic information such as attitude angle will be affected by the road condition like uphill or downhill while the carrier is moving, the present invention measures and records the possible occurred azimuth and attitude angle in advance when the carrier is turning (left, right or U) or moving uphill or downhill on each specific location, i.e. characteristic point, for the usage of follow-up judging operated by the signal processing unit 41.

The signal processing unit 41, coupled to the sensing module 40 and the storage media unit 42, is adapted for generating a navigating route according to arranging requirement, such as start point and end point, inputted by a input interface 430 and the map information stored in the storage media unit 42. The generated navigating route is shown on the display unit 43. In the present embodiment, the input interface 430 is built on the display unit 43 for user operation. After the navigating route is generated, the signal processing unit 41 utilizes the flow of modifying the navigation information shown in FIG. 3 to compare the characteristic information associated with the characteristic point on the navigating route with the real-time detected status information corresponding to the moving status of the carrier while the carrier is moving and determine whether it is necessary to modify the coordinate position of the carrier and display the icon representing the carrier on the correct position on the screen of the display unit.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A method for modifying navigation information comprising steps of:
   providing a navigating route for a carrier;
   determining at least one characteristic points according to the navigating route;
   acquiring a corresponding characteristic information of the at least one characteristic points through a storage media unit of a navigation apparatus, wherein the characteristic information is an azimuth angle, an attitude angle or the combination thereof;
   detecting moving status of the carrier through a sensing module of the navigation apparatus so as to obtain a status information with respect to the carrier while the carrier is moving, wherein the status information is an azimuth angle, an attitude angle or the combination thereof;
   comparing the characteristic information with the status information to determine whether the characteristic information is corresponding to the status information or not through a signal processing unit of the navigation apparatus;
   continuing to monitor the moving status of the carrier if the characteristic information is not corresponding to the status information through the sensing module of the navigation apparatus; and
   modifying coordinate position of the carrier to a position corresponding to the characteristic point on the navigating route if the characteristic information is corresponding to the status information through the signal processing unit of the navigation apparatus.

2. The method of claim 1 wherein the characteristic point is a position of turn, a position of uphill or a position of downhill.

3. The method of claim 1 wherein steps of acquiring a second characteristic point on the navigating route and comparing the characteristic information with respect to the second characteristic point with the moving status of the carrier are performed after the step of modifying coordinate position of the carrier.

4. The method of claim 1 wherein a step of modifying displaying location of a pattern representing the carrier to the position corresponding to the characteristic point on the navigating route shown on a display is performed after the step of modifying coordinate position of the carrier if the characteristic information of the characteristic point is corresponding to the status information.

5. A navigating apparatus disposed on a carrier comprising:
   a sensing module for detecting a moving status of the carrier and generating a status information associated with the moving status, wherein the status information is an azimuth angle, an attitude angle or the combination thereof;
   a storage media unit for storing a map information and at least a characteristic information wherein each characteristic information is associated with a characteristic point on the map information, wherein the characteristic information is an azimuth angle, an attitude angle or the combination thereof; and
   a signal processing unit, coupled to the sensing module and the storage media unit, for generating a navigating route according to the map information, determining the at least one characteristic points according to the navigating route and comparing the state information with at least one characteristic information associated with at least one characteristic point respectively on the navigating route so as to determine whether the coordinate position of the carrier need to be modified.

6. The apparatus of claim 1 wherein the sensing module is an inertial sensing module.

7. The apparatus of claim 6 wherein the inertial sensing module includes two gyroscope sensors.

8. The apparatus of claim 6 wherein the inertial sensing module includes a pair of accelerometers and a gyroscope sensor.

9. The apparatus of claim 6 wherein the inertial sensing module includes two pair of accelerometers.

10. The apparatus of claim 6 wherein the inertial sensing module includes a magnetometer and an electronic compass sensor.

11. The apparatus of claim 5 further comprising a displaying unit, coupled to the signal processing unit, for displaying the navigating route.

12. The apparatus of claim 11 wherein the signal processing unit is further capable of modifying displaying location of a pattern representing the carrier to the position corresponding to the characteristic point on the navigating route shown on the displaying unit if the characteristic information of the characteristic point is corresponding to the status information.

13. The apparatus of claim 11 wherein the displaying unit further has an input interface.

14. The apparatus of claim 5 wherein the characteristic point is a position of turn, a position of uphill or a position of downhill.

15. The apparatus of claim 5 wherein the sensing module transmits the status information with respect moving status of the carrier to the signal processing unit.

16. The apparatus of claim 5 wherein the carrier is a transportation apparatus.

* * * * *